United States Patent
Okuyama

(10) Patent No.: US 11,497,235 B2
(45) Date of Patent: Nov. 15, 2022

(54) ACETIC BACTERIAL CELL-CONTAINING FOOD COMPOSITION AND METHOD OF PRODUCING THE SAME

(71) Applicant: KEWPIE CORPORATION, Tokyo-to (JP)

(72) Inventor: Yohei Okuyama, Tokyo (JP)

(73) Assignee: KEWPIE CORPORATION, Tokyo-To (JP)

( * ) Notice: Subject to any disclaimer, the term of this patent is extended or adjusted under 35 U.S.C. 154(b) by 266 days.

(21) Appl. No.: 16/643,901

(22) PCT Filed: Sep. 4, 2017

(86) PCT No.: PCT/JP2017/031827
§ 371 (c)(1),
(2) Date: Mar. 3, 2020

(87) PCT Pub. No.: WO2019/043951
PCT Pub. Date: Mar. 7, 2019

(65) Prior Publication Data
US 2020/0268032 A1    Aug. 27, 2020

(51) Int. Cl.
*A01N 63/00* (2020.01)
*A23L 33/135* (2016.01)
*A23L 29/00* (2016.01)

(52) U.S. Cl.
CPC ......... *A23L 33/135* (2016.08); *A23L 29/035* (2016.08)

(58) Field of Classification Search
None
See application file for complete search history.

(56) References Cited

FOREIGN PATENT DOCUMENTS

| JP | 2004-261174 | 9/2004 |
|---|---|---|
| JP | 2012-131765 | 7/2012 |

OTHER PUBLICATIONS

International Search Report (ISR) dated Nov. 7, 2017 in International (PCT) Application No. PCT/JP2017/031827.
Japanese Office Action dated Jun. 29, 2018 in corresponding Japanese Patent Application No. 2018-529669, together with English translation.
A.M.O. Leite, et al., "Microbiological and chemical characteristics of Brazilian kefir during fermentation and storage processes", vol. 96, No. 7, pp. 4149-4159, 2013.

*Primary Examiner* — Jennifer E Graser
(74) *Attorney, Agent, or Firm* — Wenderoth, Lind & Ponack, LLP

(57) ABSTRACT

[Problem] Provided is a food composition containing acetic bacterial cells which has a good aroma, and a method of producing the food composition.
[Solution] The food composition containing acetic bacterial cells of the present invention contains acetic acid and n-butyric acid, the peak area ratio between which is 40:1 to 1:20, as measured by solid phase micro extraction gas chromatography-mass spectrometry for odor components in the food composition. Surprisingly, such a food composition has a fermentative aroma like rice bran which can stimulate consumers' appetite.

5 Claims, No Drawings

ACETIC BACTERIAL CELL-CONTAINING FOOD COMPOSITION AND METHOD OF PRODUCING THE SAME

TECHNICAL FIELD

The present invention relates to a food composition containing acetic bacterial cells and a method of producing the same. The present invention also relates to a food or beverage product using the food composition containing acetic bacterial cells.

BACKGROUND ART

Fermented food containing bacterial cells such as lactic acid bacteria has conventionally been preferred. Lactic acid bacteria, for example, which is contained in yogurt, cheese, and the like, have been known to help improve or increase our health, such as by improvement of intestinal environment. Recently, salt koji, sake lees, and the like containing lactic acid bacteria have been mixed in other food, not only improving our health, but also adding umami ingredients and fermentative aroma and thereby improving the taste of the food.

On the other hand, acetic acid bacteria, which is well-known to be used in vinegar manufacturing, are not fully utilized since food products using acetic bacterial cells by themselves are less than those using lactic acid bacteria. For example, a fermented soybean milk product has been suggested obtained by fermenting soybean milk containing a symbiont of a specific lactic acid bacterium and acetic acid bacterium (see Patent Document 1). However, since the technology disclosed in the Patent Document 1 is based on use of the specific lactic acid bacterium, use of acetic bacterial cells by themselves have not yet been fully provided.

PRIOR ART DOCUMENT

Patent Document

Patent Document 1: Japanese Patent Application Laid-Open (JP-A) No. 2004-261174.

SUMMARY OF THE INVENTION

Problems to be Solved by the Invention

The present inventor has studied to develop a novel food or beverage product based on acetic bacterial cells, and found that the odor of acetic acid produced by the acetic bacterial cells may adversely affect the aroma of the food or beverage product based on acetic bacterial cells. Only removal of acetic acid from the food or beverage product based on acetic bacterial cells did not result in good aroma, as well as failed to impart a fermentative aroma that has recently been favored by consumers. Thus, the object of the present invention is to provide a food composition containing acetic bacterial cells which has a good aroma, and a method of producing the food composition.

Means for Solving the Problems

In order to solve the above problems, the present inventor has intensively studied to find that a food composition containing acetic bacterial cells in which the ratio of n-butyric acid having a relatively unpleasant odor by itself to acetic acid is adjusted to a certain ratio can surprisingly produce a fermentative aroma like rice bran. The present inventor has also found that a food composition containing acetic bacterial cells from which acetic acid is removed and to which n-butyric acid is added does not produce a fermentative aroma like rice bran. In addition, the present inventor has also found that a food product without acetic bacterial cells and containing acetic acid, such as vinegar, to which n-butyric acid is added does not produce a fermentative aroma like rice bran. The present invention has been completed based on these findings.

According to one aspect of the present invention, there is provided a food composition containing an acetic bacterial cell, comprising
acetic acid and n-butyric acid;
wherein the ratio of the peak areas between the acetic acid and the n-butyric acid is 40:1 to 1:20, when odor components in the food composition are measured by solid phase micro extraction gas chromatography-mass spectrometry.

In preferred embodiments of the present invention, the ratio of the peak areas between the acetic acid and the n-butyric acid is from 1:1 to 1:5.

In preferred embodiments of the present invention, the food composition containing an acetic bacterial cell further comprises isobutyric acid.

In preferred embodiments of the present invention, the food composition containing an acetic bacterial cell is powder or liquid.

In preferred embodiments of the present invention, the acetic bacterial cell is *Gluconacetobacter*.

In some embodiments of the present invention, there is provided a food or beverage product comprising the above-described food composition containing an acetic bacterial cell.

According to another aspect of the present invention, there is provided a method of producing a food composition containing an acetic bacterial cell, the method comprising
preparing a mixture of acetic acid, n-butyric acid, and the acetic bacterial cell such that the ratio of the peak areas between acetic acid and n-butyric acid is 40:1 to 1:20 when odor components in the food composition are measured by solid phase micro extraction gas chromatography-mass spectrometry.

Effect of the Invention

According to the present invention, a food composition containing acetic bacterial cells in which the ratio of n-butyric acid having a relatively unpleasant odor by itself to acetic acid is adjusted to a certain ratio can surprisingly produce a fermentative aroma like rice bran, which will increase consumers' appetite. Thus, a food or beverage product using the food composition containing acetic bacterial cells can be expected to further expand the food market.

DETAILED DESCRIPTION OF THE INVENTION

[Food Composition]
A food composition provided in the present invention, containing acetic bacterial cells, at least contains acetic acid, and also has specific odor components described below. Acetic acid in the food composition may be derived from the acetic bacterial cells or may be an additive. Acetic bacterial cell contained by the food composition can contribute to improvement or promotion of health.

(Odor Components)

The odor components in the food composition essentially include n-butyric acid as a first odor component. When the odor components in the food composition are measured by solid phase micro extraction gas chromatography-mass spectrometry, the ratio of the peak areas between acetic acid and n-butyric acid is from 40:1 to 1:20, preferably from 30:1 to 1:10, more preferably from 1:1 to 1:5, still more preferably from 1:1 to 1:3. N-butyric acid, which has a relatively unpleasant odor by itself, unexpectedly can allow for production of a fermentative aroma like rice bran when included in the odor components at the specific ratio described above.

Preferably, the odor components in the food composition further include isobutyric acid as a second odor component. When the odor components in the food composition are measured by solid phase micro extraction gas chromatography-mass spectrometry, the ratio of the peak areas between acetic acid and isobutyric acid is preferably from 1:1 to 1000:1, more preferably from 10:1 to 100:1, still more preferably from 20:1 to 50:1. In addition, the peak area value of isobutyric acid is preferably smaller than that of n-butyric acid. Furthermore, the ratio of the peak area of acetic acid to the total peak areas of n-butyric acid and isobutyric acid is preferably from 5:1 to 1:10, more preferably from 1:1 to 1:5, still more preferably from 1:1 to 1:3. Isobutyric acid, which has a relatively unpleasant odor by itself, can allow for production of a stronger fermentative aroma like rice bran when isobutyric acid is included in the odor components at the specific ratio described above.

Preferably, the odor components in the food composition further include benzaldehyde as a third odor component. When the odor components in the food composition are measured by solid phase micro extraction gas chromatography-mass spectrometry, the ratio of the peak areas between acetic acid and benzaldehyde is preferably from 1:1 to 10000:1, more preferably from 2:1 to 500:1, still more preferably from 5:1 to 200:1. Benzaldehyde included in the odor components at the specific ratio described above can allow the odor components to produce an almond aroma.

The first to third odor components in the odor components in the food composition may be added to the acetic bacterial cells by themselves or as flavors, food materials, food additives, or the like containing the odor components. Alternatively, acetic bacterial cells that have already contained the odor components may be used. The amount of each of the odor components can be adjusted into a predetermined range by adjusting the amount of the flavor, food material, food additive or the like, or the amount of the acetic bacterial cells.

In addition to the first to third odor components, the odor components in the food composition may include other components. The other components, which are not particularly restricted, preferably do not make the odor of the food composition unpleasant as a food.

(Acetic Bacterial Cell)

Examples of the acetic acid bacterium species used in the food composition of the present invention include *Gluconacetobacter* spp., *Acetobacter* spp., and *Gluconobacter* spp.

Examples of the *Gluconacetobacter* spp. include *Gluconacetobacter diazotrophicus, Gluconacetobacter azotocaptans, Gluconacetobacter swingsii, Gluconacetobacter xylinus, Gluconacetobacter europaeus, Gluconacetobacter maltaceti, Gluconacetobacter kombuchae, Gluconacetobacter hansenii*, and *Gluconacetobacter liquefaciens*. One or two or more of them may be used. Particularly and preferably, one or two selected from *Gluconacetobacter kombuchae* and *Gluconacetobacter hansenii* may be used from the viewpoint of easy production of the effects of the present invention. In the case where the acetic bacterial cells are obtained through culturing of acetic acid bacteria, a conventionally known method can be used.

The food composition of the present invention contains acetic bacterial cells, thereby adjusting the ratio between acetic acid and n-butyric acid to a certain ratio. More content of the acetic bacterial cells in the food composition can allow it to produce a stronger fermentative aroma like rice bran. Specifically, the content is preferably from 3 to 100%, more preferably from 10 to 100%, still more preferably from 30 to 100% when the food composition is in dry state such as powder. When the food composition is in liquid, the content is preferably from 1 to 30%, more preferably from 3 to 30%, still more preferably from 5 to 30% because the content capable of being substantially uniformly dispersed or dissolved in the food composition is up to 30%.

(Form)

The food composition may be in any form, but is preferably in a powder or liquid form from the viewpoint of its processability into a food or beverage, such as a functional food or a supplement. A specific method of formulating the food composition in a powder form comprises adding dextrin, lactose, or the like to acetic bacterial cells, and drying the mixture with heat damage reduced by spray drying or freeze drying. The food composition can be used in a liquid form, in which acetic bacterial cells are dispersed, the acetic bacterial cells being obtained by removing medium components from the culture of the acetic bacterial cells. The liquid form in which acetic bacterial cells are dispersed may have a concentration of the acetic bacterial cells or a viscosity or pH adjusted according to the use.

[Food or Beverage Product]

The food or beverage product of the present invention comprises the food composition described above. The food or beverage product includes food such as functional food or supplement, or beverage such as soft drink. For example, encapsulated food such as supplement can be formed by gelatin or guar gum coating with the acetic bacterial cells in the food composition positioned at the center. The above formation may involve use of, for example, a protein derived from milk or soy as an excipient.

(Other Materials)

When the food composition of the present invention is used in a food or beverage product, the food composition may comprise other materials in combination. Examples of the other materials include sweetening agents such as trehalose, sucrose, aspartame, and phenylalanine; souring agents such as citric acid, acetic acid, lactic acid, phosphoric acid, and lemon juice; other seasonings such as sucrose, lactose, salt, and soy sauce; crude drugs such as turmeric, liver extract, cinnamon bark, fennel, peony root, and *glycyrrhiza*; cosmetic materials such as collagen, hyaluronic acid, placenta, coenzyme Q10, chondroitin, and royal jelly; amino acids such as taurine, and alanine; polysaccharide thickeners such as soy polysaccharide, guar gum, and xanthan gum; flavors such as grapefruit, and lemon.

[Method of Producing Food Composition]

The method of producing the food composition of the present invention comprises preparing a mixture of acetic acid, n-butyric acid, and acetic bacterial cells such that the ratio of the peak areas between acetic acid and n-butyric acid is 40:1 to 1:20 when odor components in the food composition are measured by solid phase micro extraction gas chromatography-mass spectrometry. Acetic acid, n-butyric acid, and acetic bacterial cells can be added to the food composition by any method, including a method comprising adding food products or food additives containing these components. The food composition containing acetic bacterial cells comprises the components and has the form as described above.

[Measurement and Analysis Methods]

The odor components in the food composition of the present invention can be measured by solid phase micro extraction gas chromatography-mass spectrometry (SPME-GC-MS) according to conditions described below.

(1) Method of Separating and Concentrating Odor Component

The odor components are separated and concentrated by solid phase microextraction using an SPME fiber and a volatile component extractor according to conditions described below.

<Conditions for Solid Phase Microextraction>
SPME Fiber:
An SPME fiber coated with two layers, an outer divinylbenzene-dispersed polydimethylsiloxane layer having a film thickness of 50 μm and an inner Carboxen-dispersed polydimethylsiloxane layer having a film thickness of 30 μm (StableFlex 50/30 μm, DVB/Carboxen/PDMS (from Sigma-Aldrich))
Volatile component extractor: Combi PAL, from CTC Analitics
Preliminary heating: 40° C., 15 min
Stirring speed: 300 rpm
Extraction of volatile components: 40° C., 20 min
Desorption time: 10 min (2) Method of Measuring Odor Component The peak areas of acetic acid, n-butyric acid, isobutyric acid, and benzaldehyde in the food composition are measured using gas chromatography and mass spectrometry according to conditions described below. Then, the ratios of the peak area of acetic acid to the total peak area of n-butyric acid, isobutyric acid, n-butyric acid, and isobutyric acid, and to the peak area of benzaldehyde are calculated.

<Conditions for Gas Chromatography>
Measurement Apparatus:
Agilent 6890N (from Agilent Technologies, Inc.)
Column:
A capillary column having a liquid phase composed of polyethylene glycol coated on the inner wall of the material at a film thickness of 0.25 μm: Length: 30 m, Inner Diameter: 0.25 mm, Film Thicknesses: 0.25 μm (SOLGEL-WAX (from SGE))
Temperature Conditions:
Keeping at 35° C. for 5 min, then heating to 120° C. at 5° C./min, then to 220° C. at 15° C./min, and keeping at 220° C. for 6 min
Carrier: He gas, gas flow rate: 1.0 mL/min
<Conditions for Mass Spectrometry>
Mass Spectrometer:
Quadrupole mass spectrometer (Agilent 5973N (from Agilent Technologies, Inc.))
Scan Mass Range: m/z 29.0-350.0
Ionization Method: EI (ionization potential: 70 eV)

EXAMPLES

The present invention will be described in more detail below with reference to Examples and Comparative Examples, the contents of which should not be interpreted to limit the present invention.

[Examples 1 to 7 and Comparative Examples 1 to 3]: Production of Food Composition Containing Acetic Bacterial Cells First, an acetic acid bacterium strain (*Gluconacetobacter hansenii* (NRB14817)) was cultured, which was then prepared into acetic bacterial cells in powder form. Next, n-butyric acid, isobutyric acid, and benzaldehyde were added to and mixed with the powder to prepare nine food compositions containing acetic bacterial cells (Examples 1 to 7 and Comparative Examples 2 to 3). Odor components in the food composition containing acetic bacterial cells were detected by solid phase micro extraction gas chromatography-mass spectrometry as described above. The peak areas of acetic acid, n-butyric acid, isobutyric acid, and benzaldehyde were measured. Then, the ratios of the peak area of acetic acid to the total peak area of n-butyric acid, isobutyric acid, n-butyric acid, and isobutyric acid, and to the peak area of benzaldehyde were calculated. Table 1 shows the results of the measurement and the calculation. In addition, the same food composition containing acetic bacterial cells as described above except that all n-butyric acid, isobutyric acid, and benzaldehyde were not added was obtained as a control (Comparative Example 1). The contents of the acetic bacterial cells in the food compositions containing acetic bacterial cells obtained in Examples 1 to 7 and Comparative Examples 2 to 3 were all 98% by mass in terms of sold content.

A 30-mL glass vessel with lid was charged with 1 g of each of the food compositions containing acetic bacterial cells in powder form from Examples 1 to 7 and Comparative Examples 1 to 3 and sealed to prepare a sample. The samples were subjected to a sensory evaluation under the following evaluation criteria. Table 1 shows the results of the sensory evaluation. In particular, Comparative Example 2 had a bad aroma due to too strong odor of acetic acid, and Comparative Example 3 had an offensive odor like ginkgo derived from butyric acid.

[Evaluation Criteria]
5: So much stronger fermentative aroma like rice bran or almond aroma than that of the control.
4: Much stronger fermentative aroma like rice bran than that of the control.
3: Stronger fermentative aroma like rice bran than that of the control.
2: Rather stronger fermentative aroma like rice bran than that of the control.
1: A little stronger fermentative aroma like rice bran than that of the control.
0: No improvement in aroma as compared with the control.

TABLE 1

|  | Example 1 | Example 2 | Example 3 | Example 4 | Example 5 | Example 6 | Example 7 | Comparative Example 2 | Comparative Example 3 |
| --- | --- | --- | --- | --- | --- | --- | --- | --- | --- |
| Acetic acid | 138386000 | 163895000 | 134939000 | 45068000 | 188144000 | 21739000 | 15367000 | 254381000 | 3241000 |
| N-butyric acid | 5344000 | 12957000 | 42122000 | 89739000 | 480136000 | 66430000 | 80984000 | 2992000 | 181523000 |
| Isobutyric acid | 32709000 | 26550000 | 978000 | 2155000 | 8019000 | 259000 | 194000 | 190000 | 98348000 |
| Benzaldehyde | 59000 | 51000 | 1057000 | 5898000 | 1537000 | 55000 | 57000 | 50000 | 1328000 |

TABLE 1-continued

| | Example 1 | Example 2 | Example 3 | Example 4 | Example 5 | Example 6 | Example 7 | Comparative Example 2 | Comparative Example 3 |
|---|---|---|---|---|---|---|---|---|---|
| Acetic acid:n-butyric acid | 26:1 | 13:1 | 3.2:1 | 1:2 | 1:2.6 | 1:3.1 | 1:5.3 | 85:1 | 1:56 |
| Acetic acid:isobutyric acid | 4.2:1 | 6.2:1 | 138:1 | 21:1 | 23.5:1 | 83.9:1 | 79.2:1 | 1338:1 | 1:30 |
| Acetic acid:(n-butyric acid + isobutyric acid) | 3.6:1 | 4.2:1 | 3.1:1 | 1:2 | 1:2.6 | 1:3.1 | 1:5.3 | 80:1 | 1:71 |
| Acetic acid:benzaldehyde | 2345:1 | 3214:1 | 128:1 | 7.6:1 | 122:1 | 395:1 | 269:1 | 5085:1 | 2.4:1 |
| Evaluation | 1 | 1 | 2 | 5 | 4 | 4 | 3 | 0 | 0 |

Example 8

A food composition containing acetic bacterial cells was prepared in the same manner as in Example 4 except that the acetic acid bacterium strain was change from *Gluconacetobacter hansenii* (NRB14817) to *Gluconacetobacter kombuchae* (NRB105051). The obtained food composition containing acetic bacterial cells in powder form was subjected to a sensory evaluation, which resulted in perception of similar extent of fermentative aroma like rice bran or almond aroma as Example 4.

Comparative Example 4

N-butyric acid was added to a vinegar (content of acetic bacterial cells: not detected, content of n-butyric acid: 0% by mass) to prepare a food composition in liquid form. Odor components in the food composition in liquid form were measured by solid phase micro extraction gas chromatography-mass spectrometry as described above, which resulted in a ratio of the peak areas between acetic acid and n-butyric acid of 26:1. The food composition in liquid form was subjected to a sensory evaluation, which resulted in no fermentative aroma like rice bran, having bad aroma due to too strong odor of acetic acid.

[Example 9]: Production of Dry-Form Food

Next, 0.01% of the food composition containing acetic bacterial cells obtained in Example 4, 97.99% of dextrin, and 2% of sucrose fatty acid ester were mixed, from which a dry-form food (tablet compression) of the present invention was produced by a conventional method. The dry-form food (tablet compression) had a fermentative aroma like rice bran, producing a pleasant flavor.

[Example 10]: Production of Dry-Form Food

Next, 3% of the food composition containing acetic bacterial cells obtained in Example 4, 95% of dextrin, and 2% of sucrose fatty acid ester were mixed, from which a dry-form food (tablet compression) of the present invention was produced by a conventional method. The dry-form food (tablet compression) also had a fermentative aroma like rice bran, producing a pleasant flavor. Preferably, the fermentative aroma like rice bran was superior to that of Example 9.

[Example 11]: Production of Miso Soup

Next, 1% of the food composition containing acetic bacterial cells obtained in Example 4 was suspended in 10% of miso and 89% of fresh water, from which a miso soup of the present invention was produced by a conventional method. The miso soup had an increased fermentative aroma like rice bran, producing a pleasant flavor, as compared with one without the food composition containing acetic bacterial cells the present invention added thereto.

The invention claimed is:

1. A food composition, comprising:
   an acetic bacterial cell,
   acetic acid,
   n-butyric acid, and
   isobutyric acid;
   wherein the acetic bacterial cell is *Gluconacetobacter*, and
   wherein the ratio of the peak areas between the acetic acid and the n-butyric acid is 40:1 to 1:20, when acetic acid, n-butyric acid, and isobutyric acid in the food composition are measured by solid phase micro extraction gas chromatography-mass spectrometry.

2. The food composition according to claim 1, wherein the ratio of the peak areas between the acetic acid and the isobutyric acid is 1:1 to 1000:1.

3. The food composition according to claim 1, wherein the ratio of the peak area of acetic acid to the total peak areas of n-butyric acid and isobutyric acid is 5:1 to 1:10.

4. The food composition according to claim 1, wherein the food composition is powder or liquid.

5. A food or beverage product comprising the food composition according to claim 1.

* * * * *